United States Patent Office 3,531,242
Patented Sept. 29, 1970

3,531,242
METHOD OF PREPARING HIGHLY PURE CRYSTALS OF SALTS OF PHOSPHORIC ACID
Masashi Hayakawa, Tokyo, and Yoshito Yasutake, Shisei Fujita, and Mitsuhiko Ohmura, Yamaguchi-ken, Japan, assignors to Central Glass Co., Ltd., Yamaguchi-ken, Japan
No Drawing. Continuation-in-part of application Ser. No. 472,031, July 14, 1965. This application Apr. 10, 1969, Ser. No. 815,207
Claims priority, application Japan, Mar. 29, 1965, 40/18,149
Int. Cl. C01b 25/28, 25/30
U.S. Cl. 23—107                                                18 Claims

ABSTRACT OF THE DISCLOSURE

Substantially pure crystals of sodium ammonium hydrogen phosphate are prepared from a wet process phosphoric acid by: neutralizing a wet process phosphoric acid with ammonia to a pH-value between 3.0 and 6.5 without cooling the resultant solution, to form ammonium dihydrogen phosphate as a main component dissolved therein and also precipitated impurities, roughly separating said solution into two parts, a first of which is a solution containing a fine portion of said precipitates in the form of a suspension and a precipitate consisting of coarse and heavy portions of said precipitated impurities, adding to the solution containing fine precipitates at least one sodium salt selected from the group consisting of sodium hydroxide, sodium carbonate and sodium bicarbonate to form a solution containing sodium ammonium hydrogen phosphate, crystallizing said sodium ammonium hydrogen phosphate, crystallizing said sodium ammonium hydrogen phosphate in said solution to form crystals having a particle size not less than 0.3 mm., separating said crystals from the mother liquor containing fine precipitates by using a separating means, through which said mother liquor and precipitates suspended therein are passable but said crystals are not passable, whereby the said crystals remain on said separating means, and then washing said crystals with water.

CROSS-REFERENCE TO RELATED APPLICATIONS

This application is a continuation-in-part of copending application, Ser. No. 472,031, filed on July 14, 1965, now abandoned.

BACKGROUND OF THE INVENTION

Field of the invention

The present invention relates to a method for manufacturing highly pure crystals of sodium ammonium hydrogen phosphate (which is popularly called microcosmic salt or salt of phosphorous) from wet process phosphoric acid.

Description of the prior art

Sodium ammonium hydrogen phosphate

(NaNH$_4$HPO$_4$·4H$_2$O)

which is also called microcosmic salt or salt of phosphorous, has heretofore been manufactured by one of the three methods hereinafter mentioned. The first method: a refined and highly pure phosphoric acid is neutralized with ammonia and a sodium salt (for instance, sodium hydroxide or sodium carbonate). When the reaction is complete, the reacted liquor is cooled to obtain crystals of microcosmic salt.

In the second method, highly pure crystals of diammonium hydrogen phosphate are first obtained by adding ammonia to either a highly pure phosphoric acid or an ordinary wet-process phosphoric acid. The crystals are dissolved in water to form a solution of diammonium hydrogen phosphate, to which sodium chloride is added to cause a reaction by which microcosmic salt is formed. The microcosmic salt is then crystallized.

The third method comprises two steps: in the first step, crystals of highly pure disodium hydrogen phosphate are first obtained by reaction of phosphoric acid, which is referred to in the afore-mentioned second method, with a sodium salt, and then in the second step, the thus obtained crystals are dissolved in water to make a phosphate solution from which microcosmic salt is crystallized by reaction of the phosphate solution with ammonium chloride.

Of the conventional methods mentioned above, the first method has a defect in its requirement for phosphoric acid of extremely high purity, and the second and the third methods have the defect that the production processes are complicated due to the manufacture of an intermediate product as mentioned above. Microcosmic salt manufactured by the aforesaid three methods has a considerably high cost, and therefore the development of a method to produce microcosmic salt at a lower cost has been strongly desired in the field related to the present invention. Furthermore, when wet process phosphoric acid is used in the first stage of the second and third methods of manufacturing microcosmic salt, is is difficult to manufacture an intermediate product of high purity, which results in the manufacture of microcosmic salt inferior in purity to that manufactured according to the first method. In order to eliminate the impurities contained in the phosphoric acid, such countermeasures have been taken, for instance, to adjust the rate of ammonia addition within a specified range, or to control the temperature and pressure at a selected degree, and efforts have been exerted to produce an intermediate product of as high purity as possible.

SUMMARY OF THE INVENTION

The object of the present invention is to provide a method for manufacturing highly pure crystals of microcosmic salt at low cost. More particularly, this invention relates to a method for the manufacture of microcosmic salt as highly pure as the microcosmic salt which is obtained according to the aforementioned first method but from the cheap wet process phosphoric acid which contains a large amount of impurities.

We, the inventors, having manufactured microcosmic salt for trial using wet process phosphoric acid according to the aforementioned first, second and third methods, obtained the following knowledge:

When, according to the first method, a solution containing microcosmic salt was prepared by adding to a wet process phosphoric acid, ammonia and sodium salt in amounts sufficient to form the desired microcosmic salt, there was formed a solution containing dissolved therein microcosmic salt and also impurities in the form of precipitates such as iron phosphate, aluminum phosphate, silica gel, various fluoride compounds and complexes of said impurities; all the precipitates of said impurities in the solution being in the form of a pulpy slurry having high viscosity. Therefore, it was found that separation of the precipitates from the slurry contained in the solution by means of filtration is very difficult since the precipitates of the impurities were in the colloidal state even when separation was tried to obtain a solution of microcosmic salt by eliminating the aforementioned precipitates of the impurities from the said viscous, pulpy slurry. Moreover, it was also found that ordinary methods of separation, for instance, the use of a centrifuge could not separate them perfectly.

As for the second method and third method, when ammonia or a sodium salt was added to a wet process phosphoric acid, both methods induced the solution to form very fine precipitates of impurities, especially the third method has a tendency to produce much finer precipitates than that produced by the second method, and it was also made clear at the same time that it is impossible to separate the solution containing the required diammonium hydrogen phosphate or disodium hydrogen phosphate from the precipitates mentioned hereinbefore. Another of our findings is that, when the crystals of diammonium hydrogen phosphate or disodium hydrogen phosphate are obtained from the resultant solution which contains a precipitate of impurities, the crystals were found containing the precipitates of impurities and this made it impossible to obtain an intermediate product of high purity.

It was also found that in all of the first, second and third conventional methods mentioned above, there is too much solution in the precipitates at the time of separating the solution from the precipitates, thus making the yield of the solution extremely low.

Having found it very difficult or rather impossible to effectuate the complete separation of the solution from the precipitates in the study of the conventional methods as mentioned in the foregoing paragraphs, we, the inventors permitted the microcosmic salt to crystallize in the solution containing the fine precipitates of impurities and the crystals crystallized therein were examined and found to contain no precipitates of impurities in the crystals, and thus, we, the inventors have succeeded in completing the present invention. More particularly, according to the study of the inventors, it was found that, when ammonia and the sodium salt, which are necessary for the formation of microcosmic salt, were added to a wet process phosphoric acid, a solution containing percipitates of impurities was obtained, from which the crystals of microcosmic salt were crystallized by means of a suitable method of crystallization, for instance, cooling, concentration, or a combination of cooling and concentration, which crystals were then separated from the mother liquor containing the precipitates of impurities, by using a filtering means through which the mother liquor and the precipitates contained therein are passable but through which the crystals are not passable, thus making it possible to obtain crystals of microcosmic salt having a purity of about 98%. However, in the separation of the crystals of microcosmic salt and the mother liquor, the purity of the microcosmic salt is apt to become lower due to the fact that, of the whole precipitates of impurities, those particles having large diameter inevitably remain together with the crystals of microcosmic salt on the surface of the filter cloth or screen or grid having meshes large enough to allow the passage of the finer precipitates.

Since the object of the present invention is to provide a method for obtaining crystals of microcosmic salt more pure than the crystals of microcosmic salt mentioned in the foregoing, an intermediate rough separation step to remove a coarse and heavy portions of said precipitates of impurities is added to the procedures stipulated in this invention. The rough separation step mentioned herein means permitting the solution containing precipitates of impurities to stand for a time long enough to allow the relatively heavy and coarse portions of the precipitates to segregate and remove the supernatant liquor including finer colloidal precipitates by means of decantation, centrifugal sedimentation of filtration with a rough mesh. This rough separation step, which is provided for the purpose of removing the course and heavy portions of the precipitates of impurities, is done after the ammonia is added to the wet process phosphoric acid.

A detail explanation of the method of the present invention will be given hereinafter, covering each of the steps.

First step

As for the first step provided in this invention, either of two procedures may be taken; the first one is to neutralize a wet process phosphoric acid ($P_2O_5$ concentration 28–32 wt. percent) directly with ammonia and the other is to add a small amount of sodium salt before the neutralization with ammonia. In both cases, the ammonia used can be in the state of either gas or liquid, whichever is convenient. In this first step, the neutralization with ammonia should be adjusted so as to keep the pH of phosphoric acid within the range of 3–6.5. The principal component of the thus neutralized solution is ammonium dihydrogen phosphate.

Incidentally, the neutralization according to the first procedure, wherein the phosphoric acid is neutralized with ammonia, need not be conducted under special conditions, but can be conducted by simply adding ammonia in a normal way. The temperature of the solution is raised nearly up to the boiling point by the heat of reaction. Due to the raised temperature caused by the heat of reaction, the reaction velocity increases and the formation of a greater guantity of coarse precipitates of impurities which are readily separable is expedited.

The second procedure in the first step to neutralize phosphoric acid with ammonia is one of the essential features of this invention which has been developed from the knowledge obtained in the research works conducted by the inventors with the purpose of forming precipitates of impurities, which are large in size and which are readily separable, from wet process phosphoric acid. More particularly, this procedure comprises adding a small amount of a sodium salt which is soluble in phosphoric acid, such as sodium hydroxide, sodium carbonate, sodium sulfate, sodium chloride, sodium nitrate, sodium bicarbonate and a part of the mother liquor obtained from the last step and the fifth step which have been mentioned in detail hereinafter (i.e., the mother liquor contains microcosmic salt), etc., to a wet process phosphoric acid and then neutralizing said mixture with ammonia. For instance, to 100 parts by weight of phosphoric acid whose $P_2O_5$ concentration is approximately 30% there should be added sodium salt in an amount corresponding to 0.2–3 parts by weight of sodium. If the sodium salt is added in a quantity not within the range mentioned in the foregoing, the addition of ammonia which follows the addition of sodium salt will form precipitates of impurities wherein the portion of finer precipitates, which does not easily settle and separate, increases and makes it impossible to separate the precipitates easily in the second procedure mentioned hereinafter. It has not yet been made clear why separable precipitates are formed by the neutralization with ammonia after the addition of the proper amount of sodium salt to phosphoric acid. However, it is assumed that the process, wherein impurities such as fluorine and silica contained in phosphoric acid form sodium silicofluoride and fixed thereby before being neutralized with ammonia, makes the precipitates settle easily. The assumption proceeds further that, since it has been clarified that sodium silicofluoride formed hereby no longer exists in the precipitate formed after the neutralization with ammonia, fluorine and silica contained in phosphoric acid are fixed in the state of sodium silicofluoride and then react with ammonia and a process such as this is responsible for the change of the nature of the precipitates.

In the case where the combined usage of sodium salt and ammonia is adopted in the neutralization in the first step of this invention, the yield of the solution is remarkably improved when the separation of the precipitates of impurities from the solution is conducted according to the second step mentioned hereinafter. As for the neutralization method according to the second procedure, the neutralization reaction may be conducted in such a way as to neutralize the wet process phosphoric acid with ammonia to such an extent wherein the pH value is controlled at less than 2 and no precipitates are formed, then discontinuing the addition of ammonia, adding the sodium salt, and again adding ammonia to continue the neutralization until the pH reaches the range of 3–6.5. So long as the pH value is controlled at less than 2, no precipitates of impurities will be formed even if ammonia is added to the phosphoric acid. If sodium salt is added to the partially neutralized phosphoric acid having a pH value as mentioned above, the same effect as mentioned in the foregoing procedure comprising two steps of neutralization will be obtained. Therefore, from the viewpoint of an industrial process, it is advisable to use the mother liquor after the separation of microcosmic salt mentioned in the fifth and the last steps since the mother liquors contain sodium salt.

Second step

In the second step, the ammonium phosphate solution obtained in the first step is roughly separated into two parts, a first of which is a portion of precipitates of impurities having coarse and heavy particles and a second of which is a portion of a solution containing fine precipitates of impurities. As for the method of separation, its explanation has already been made hereinbefore; the names of several of the typical separators used for the purpose is given hereunder:

Oliver filter, American filter, continuous centrifuge (such as a helical-conveyor conical-bowl type, cylindrical-conical helical conveyor type), thickener.

It may also be said that in the second step, the purpose of the step will be satisfied by separating the solution, which contains such fine precipitates as will pass through the filter cloth or to remain suspended even after sedimentation and decantation, from most of the precipitate of impurities (i.e., coarse grains or heavier precipitates). In this step it is desirable that the separation should be conducted before the temperature of the ammonium phosphate solution decreases to below 60° C., since at the separation, the precipitates will be hindered due to the crystals of ammonium dihydrogen phosphate which are crystallized when said ammonium phosphate solution is cooled.

Third step

In the third step, at least one kind of sodium salt selected from the group consisting of sodium hydroxide, sodium carbonate and sodium bicarbonate is added to the solution containing the fine precipitates of impurities in the form of suspension obtained in the second step. In this case, the quantity of sodium salt to be added to the solution should be equivalent to the amount of phosphoric acid or in the range of 30% more or less than the equivalent thereof.

In the third step, new precipitates are formed in addition to the precipitates formed in the second step; the former precipitates are as fine as the latter or may even be finer than the latter. The reaction of the solution is also conducted without cooling in the third step, as well as in the first and second steps according to this invention. In this third step, a thick solution of microcosmic salt, wherein fine precipitates of impurities are suspended, is obtained.

Fourth step

It is a widely known fact that microcosmic salt (in case that it is represented as the anhydride) has a solubility at 25° C. of approximately 15 g./100 g. $H_2O$ and 100 g./100 g. $H_2O$ at 70° C. According to the present invention, it is required to crystallize the crystals of microcosmic salt in a larger size than the precipitates of impurities suspended in the solution obtained in the third step. In the fourth step, therefore, a microcosmic salt whose crystals are at least larger than 0.3 mm. in diameter must be formed either by cooling, or concentration or a combination of cooling and concentration. Since the solubility of microcosmic salt in water at the ordinary room temperature is low, as mentioned above, it is possible to obtain crystals having the size as mentioned above by natural cooling of the solution obtained in the third step at ordinary room temperature. However, it is advisable to use a continuous crystallizer which is usually employed in industries. As for such crystallizing equipment, there are continuous evaporator crystallizers and continuous cooling crystallizers, of which the Krystal-Oslo type or, Draft-tube-body type are especially good. In the case where a cooling method or a concentrating cooling method is used, it may be advisable to cool the solution to a temperature ranging from 20–60° C.

To sum up the foregoing, in the fourth step the quenching method should be avoided; at first crystal nuclei are allowed to form in the solution, and then the solution is treated in such a way as to let the crystal nuclei grow slowly. Should this method be carried out, it would not be so difficult to obtain crystals whose size is as large as the aforementioned size.

Fifth step

In this step, the mother liquor containing precipitates of impurities is separated from the crystals of microcosmic salt. As for the separators, such filters or centrifuges as are equipped with filter cloth, or screen, or grid permitting the passage of the aforementioned precipitates of impurities but not permitting the passage of the crystals of microcosmic salt should be used. The separators to be applied in this step preferably have such functions or types as described in following passage, that is, that "when a slurry containing the crystals of microcosmic salt and precipitates is fed on the filter cloth, or screen, or grid and compressed air, or a vacuum, or a centrifugal force is applied thereon, the mother liquor containing fine precipitates will quickly pass through the filter cloth, or screen, or grid and there remain only the crystals on the filter cloth, or screen, or grid." In the following are given some of the typical separators:

Filter: Travelling-pan filter, tilting-pan filter, Lurgi belt filter;

Centrifuge: Reciprocating-conveyor continuous centrifuge.

On these filters or centrifuges, a filter cloth, or screen, or grid having meshes or perforations ranging from 0.3 mm. down to 0.05 mm. is usually used.

Sixth step

In this step, the precipitates of impurities adhered to the crystals of microcosmic salt are rinsed with water, and accordingly this process is carried out by washing the crystals which have been collected on the filter cloth in the fifth step, with water at room temperature. During the washing process, a small quantity of precipitates of impurities are removed from the surface of the crystals and washed away through the filter cloth, or screen, or grid. The purity of the crystals thus obtained on the filter cloth, or screen, or grid is 99% or more. Since the solubility of microcosmic salt is so low that the loss of microcosmic salt due to the washing in this step is almost negligible.

DESCRIPTION OF THE PREFERRED EMBODIMENTS

Example 1

Analysis of the wet process phosphoric acid used as the starting material is given in weight percent as follows: $P_2O_5$, 29.02; $SO_3$, 2.79; F, 206; Fe, 0.540; Al, 0.270; specific gravity, 1.358.

Analysis of the supernatant from the mother liquor which was left after the crystals of sodium ammonium hydrogen phosphate, or so-called microcosmic salt were separated in the fifth step and the sixth step is given in percent (wt. percent) as follows: $P_2O_5$, 4.36; $SO_3$, 6.13; $Na_2O$, 2.87; $NH_3$, 5.50.

To 20 kg. of said phosphoric acid were added 13.7 kg. of supernatant taken from the mother liquor obtained in the fifth step and the sixth step, and then the mixture was neutralized with ammonia gas until the pH was 5.0. The liquid was in a boiling state and was about to start precipitation of impurities. Then the liquid was placed in a centrifugal separator and 29.2 kg. of solution were obtained. The following is the analysis of this solution in wt. percent: $P_2O_5$, 18.85; $SO_3$, 4.21; $Na_2O$, 0.713; $NH_3$, 7.30; F, 0.83; Fe, 0.017; Al, 0.063.

While the solution was maintained at a temperature of 80° C., 3.8 kg. of soda ash were added. After the soda ash dissolved, the solution was cooled to 20° C. The crystals of sodium ammonium hydrogen phosphate were separated by a centrifugal separator.

At the time of separation, the crystals sticking to the inner surface of the basket of the separator were washed by injecting thereto 2.6 kg. of water. The separated crystals were dried and 13.0 kg. of final product of crystals and 19.8 kg. of mother liquor were obtained. In this mother liquor was contained the wash water used at the time the crystals were washed. The analysis made on the final crystals and the mother liquor is shown below in wt. percent:

|  | $P_2O_5$ | $Na_2O$ | $NH_3$ | $SO_3$ | F | Fe | Al |
|---|---|---|---|---|---|---|---|
| Crystal | 33.80 | 14.70 | 8.15 | 0.053 | 0.015 | 0.0014 | 0.0011 |
| Mother liquor | 4.99 | 2.23 | 5.13 | 6.03 | 1.20 | 0.025 | 0.005 |

Since this mother liquor contained deposits such as fluorine, iron and aluminum, the liquor was left to settle and only the supernatant of the liquor was used again in the first step of the process of the following cycle, while the sludge-like portion was removed.

Example 2

Analysis of the wet process phosphoric acid used as the starting material is shown below in wt. percent: $P_2O_5$, 30.80; $SO_3$ 2.30; F, 2.85; Fe, 0.506; Al, 0.470; specific gravity, 1.360.

To 400 kg. of the wet process phosphoric acid were added 40 kg. of water and then the mixture was neutralized with ammonia gas, with pH value being fixed at 4.8. The liquid was in a boiling state, followed by the formation of precipitates including iron, aluminum, fluorine, silicic acid, etc. The liquid was then placed in a continuous-type centrifugal sedimentation machine to remove the coarse and heavy portions of said precipitates which were relatively easy to settle. In this manner, 354 kg. of considerably turbid, imperfect supernatant were obtained. The analysis of this supernatant is shown in wt. percent as follows: $P_2O_5$, 27.85; $SO_3$, 2.12; $NH_3$, 8.93; F, 0.59; Fe, 0.034; Al, 0.019.

To this supernatant were added 69 kg. of soda ash, and after reaction had taken place, the solution was cooled to 50° C. The crystals of sodium ammonium hydrogen phosphate were placed in a centrifugal separator. Then, 40 kg. of water were injected to wash the crystals, and the washings were mixed in the mother liquor. The separated crystals were dried, and 193 kg. of dried crystals of sodium ammonium hydrogen phosphate and 230 kg. of mother liquor were obtained. The analyses made on said crystals and the mother liquor are as follows:

|  | $P_2O_5$ | $Na_2O$ | $NH_3$ | $SO_3$ | F | Fe | Al |
|---|---|---|---|---|---|---|---|
| Crystal | 33.82 | 14.71 | 8.20 | 0.032 | 0.016 | 0.0011 | 0.0009 |
| Mother liquor | 15.18 | 6.46 | 5.82 | 3.15 | 0.89 | 0.059 | 0.029 |

Example 3

Analysis of the wet process phosphoric acid used as the starting material is shown in wt. percent as follows: $P_2O_5$, 30.25; $SO_3$, 2.46; F, 1.88; Fe, 0.41; Al, 0.36; specific gravity, 1.360.

While 5 kg. of said phosphoric acid were heated and stirred, a 30% aqueous ammonia was gradually added to carry out neutralization until the pH became 5.8. The liquid was in a boiling state, and impure substances began to precipitate. This liquid was left to settle at 80° C., and 5.1 kg. of supernatant containing a small amount of suspended fine precipitates were obtained. The following is the analysis obtained of the said supernatant given in wt. percent: $P_2O_5$, 20.76; $NH_3$, 8.75; $SO_3$, 1.75; F, 0.48; Fe, 0.084; Al, 0.080.

While maintaining this liquid at a temperature of 70° C., 0.585 kg. of solid caustic soda was added and dissolved, and the resultant solution was cooled to 20° C. The crystals of sodium ammonium hydrogen phosphate formed were separated on a suction filter, then washed with 850 cc. of water and subsequently dried.

From the above processes, 2.7 kg. of crystals and 3.8 kg. of separated mother liquor containing washings were obtained. The analyses of the microcosmic salt and the mother liquor are as follows:

|  | $P_2O_5$ | $Na_2O$ | $NH_3$ | $SO_3$ | F | Fe | Al |
|---|---|---|---|---|---|---|---|
| Crystal | 32.78 | 14.35 | 8.08 | 0.047 | 0.014 | 0.008 | 0.002 |
| Mother liquor | 4.51 | 1.25 | 5.60 | 2.38 | 0.64 | 0.13 | 0.10 |

Example 4

Analysis of the wet process phosphoric acid used as the starting material is as follows, given in wt. percent: $P_2O_5$, 29.89; $SO_3$, 2.50; F, 2.47; Fe, 0.59; Al, 0.48; specific gravity, 1.359.

The wet process phosphoric acid was supplied at the rate of 300 kg. per hour continuously into a stirring tank with capacity of 250 liters, and to this tank, ammonia and water vapor were introduced through a common introduction pipe, and the pH was controlled so as to be maintained at 3.6–3.8

The liquid was in boiling state, and the thus neutralized liquid containing a large amount of precipitates of impurities was obtained. This liquid was placed in a centrifugal sedimentation machine, and a supernatant containing suspended fine precipitates which are hard to settle was obtained at the rate of 265 kg. per hour.

The supernatant was analyzed and the result was shown in wt. percent as follows: $P_2O_5$, 27.25; $SO_3$, 2.26; $NH_3$, 6.83; F, 0.42; Fe, 0.062; Al, 0.042.

The supernatant was introduced to a cooling-crystallizer together with liquid caustic soda (NaOH 48%) which was supplied at the rate of 85 kg. per hour. While, on the other hand, ammonia gas was introduced into the crystallizer through the bottom portion thereof at the rate of 3–4 kg. per hour, and the liquid in the crystallizer was cooled to 25° C.

The slurry containing formed crystals was withdrawn through an outlet near the bottom of said crystallizer, and was fed in a centrifugal separator with a 0.25 mm. grid.

Water was injected against the crystals sticking to the inner surface of the basket of the separator at the rate of 48 kg. per hour to wash the crystals. The washings were mixed with the separated mother liquor. The crystals were dried and the final product was obtained. In this way, crystals of microcosmic salt were obtained at the rate of 182 kg. per hour and mother liquor was obtained at the rate of 212 kg. per hour. The following are the analysis of the crystal product and the mother liquor in wt. percent:

|  | $P_2O_5$ | $Na_2O$ | $NH_3$ | $SO_3$ | F | Fe | Al |
|---|---|---|---|---|---|---|---|
| Crystal | 32.50 | 14.32 | 7.86 | 0.03 | 0.04 | 0.006 | 0.002 |
| Mother liquor | 6.60 | 2.53 | 3.67 | 2.90 | 0.60 | 0.085 | 0.030 |

Example 5

2 liters of a 27.0% wet process phosphoric acid solution containing an impurity consisting of $H_2SiF_6$ amounting to 2.96% was added with sodium carbonate, sodium hydroxide and sodium sulfate. The mixture was then neutralized with ammonia which was introduced at a rate of 14.3 grams per minute and at a temperature of 104° C. until the pH became 4.2. The resultant product of neutralization was filtered through qualitative analysis grade filter paper under a filtration pressure of −460 mm. Hg at 80° C. The rate of precipitation of $Na_2SiF_6$ and the filtering velocity observed at that time are shown in the following table.

| No. of test: | Na compound | Amount of substances added as Na, percent | Rate of precipitation of $Na_2SiF_6$, percent | Filtering velocity, m.³/m.² hr. |
|---|---|---|---|---|
| Blank | | 0 | 0 | 0.86 |
| 1 | $Na_2CO_3$ | 0.22 | 23 | 1.26 |
| 2 | $Na_2CO_3$ | 0.45 | 44 | 1.48 |
| 3 | $Na_2CO_3$ | 0.67 | 62 | 1.88 |
| 4 | NaOH | 0.89 | 72 | 2.38 |
| 5 | NaOH | 1.11 | 72 | 2.08 |
| 6 | NaOH | 1.11 | 78 | 2.21 |
| 7 | $Na_2SO_4$ | 1.11 | 78 | 2.56 |
| 8 | $Na_2SO_4$ | 1.56 | 83 | 2.46 |
| 9 | $Na_2SO_4$ | 2.23 | 83 | 2.30 |

As will be noted from the above table, the use of salts of sodium are useful for removing $H_2SiF_6$ which tends to exist in large amounts as impurities contained in wet process phosphoric acid. Thus, even when the starting material phosphoric acid used contains so much impurities as described above, crystals of microcosmic salt which are highly pure as those described in Examples 1 through 4 may be obtained.

Example 6

The wet process phosphoric acid was fed at the rate of 2 m.³ per hour continuously into a stirring tank with a capacity of 0.5 m.³, together with the mother liquor separated from the crystals of microcosmic salt fed at the rate of 0.5 m.³ per hour. Analysis of the wet process phosphoric acid and the mother liquor at the time of feeding is shown below in wt. percent.

| Composition | $P_2O_5$ | $SO_3$ | F | Fe | Al | Na |
|---|---|---|---|---|---|---|
| Wet process phosphoric acid | 29.6 | 2.45 | 2.6 | 0.65 | 0.48 | |
| Mother liquor | 14.7 | 12.0 | 1.0 | 0.15 | 0.11 | 4.9 |

In the stirring tank, reaction between hydrofluosilicic acid contained in the wet process phosphoric acid and sodium contained in the mother liquor took place to form a precipitate of sodium silicofluoride. The above mixture, inclusive of the aforementioned precipitate, was fed into a stirring tank with a capacity of 3 m.³. Gaseous ammonia was introduced into the stirring tank at its bottom to neutralize the mixture until the pH value reached 4.2. The mixed solution thus neutralized was heated up to the boiling point by the heat of neutralization and at the same time the impurities such as Fe, Al, Si and F contained in the phosphoric acid precipitated. The pulpy slurry containing the precipitates was sent into a tank with a capacity of 3 m.³ and stirring was slowly continued for one hour and then the coarse and heavy portion of the precipitates was separated from the slurry with a mechanical-conveyor centrifuge. A supernatant fluid of ammonium phosphate solution (concentration 24% in $P_2O_5$), amounting to approximately 2.1 m.³ per hour was obtained. The supernatant was then fed continuously into a stirring tank with a capacity of 1.5 m.³ and soda ash was added to the solution at the rate of 470 kg. per hour with stirring to neutralize the solution and a solution equivalent to microcosmic salt in composition was obtained at the rate of 2.2 m.³ per hour. This solution was fed into the continuous evaporator (circulating magma crystallizer) with a capacity of 10 m.³ and was cooled to 45–50° C. and microcosmic salt was crystallized. The slurry which contained crystals of microcosmic salt which had grown to a size of 0.5–0.7 mm. in diameter, was led out of the crystallizer, and sent into a reciprocating conveyor continuous centrifuge (grid perforated 0.3 mm. in diameter), in which the crystals were separated from the mother liquor and the crystals were then washed. Highly pure crystals of microcosmic salt are obtained in this way at the rate of 1550 kg. per hour. Analysis of microcosmic salt thus obtained is shown below in wt. percent: $NaNH_4HPO_4 \cdot 4H_2O$, 99.5; $SO_3$, 0.06; F, 0.02; Fe, 0.003; Al, 0.002; $H_2O$ (moisture), 0.35.

As mentioned above, the mother liquor after separation was recycled and joined the fresh wet process phosphoric acid. The mother liquor repeatedly follows the same recycling process.

What is claimed is:

1. A method of manufacturing substantially pure crystals of sodium ammonium hydrogen phosphate from a wet process phosphoric acid, said method comprising the steps of: neutralizing a wet process phosphoric acid with ammonia to a pH value between 3.0 and 6.5 without cooling to form ammonium dihydrogen phosphate in solution as a main component said solution containing precipitates of impurities, rough separating said solution into two parts, a first of which is a solution containing a fine portion of said precipitates in the form of a suspension and a second of which is a precipitate consisting of coarse and heavy portions of said precipitates of impurities, adding to said solution containing fine precipitates at least one sodium salt selected from the group consisting of sodium hydroxide, sodium carbonate and sodium bicarbonate to form a solution containing sodium ammonium hydrogen phosphate, crystallizing said sodium ammonium hydrogen phosphate in said solution to form crystals having a particle size not less than 0.3 mm., separating said crystals from the mother liquor containing fine precipitates by using a separating means through which the mother liquor and precipitates suspended therein are passable but through which the crystals are not passable, thereby retaining the crystals on said means and then washing said crystals with water.

2. A method according to claim 1, wherein the rough separating is effected by decantation, centrifugal sedimentation or filtration wherein a filter medium having large meshes is used.

3. A method according to claim 1, wherein the crystallization of sodium ammonium hydrogen phosphate is effected in a continuous crystallizer.

4. A method according to claim 3, wherein said crystallizer is a continuous cooling crystallizer.

5. A method according to claim 3, wherein said crystallizer is a continuous evaporating crystallizer.

6. A method according to claim 1, wherein the separating means is a filter equipped with a filter medium having openings of less than 0.3 mm.

7. A method according to claim 6, wherein said filter is a vacuum filter.

8. A method according to claim 1, wherein said separating means is a centrifuge.

9. A method for manufacturing substantially pure crystals of sodium ammonium hydrogen phosphate from a wet process phosphoric acid, said method comprising the steps of: adding a small amount of at least one sodium salt selected from the group consisting of sodium chloride, sodium sulfate, sodium nitrate, sodium hydroxide, sodium carbonate and sodium bicarbonate to a wet process phosphoric acid, neutralizing the resultant solution with ammonia to a pH-value between 3.0 and 6.5 without cooling to form ammonium dihydrogen phosphate in solution as a main component said solution containing precipitates of impurities, rough separating said solution into two parts, a first of which is a solution containing a fine portion of said precipitates in the form of a suspension and a second of which is a precipiate consisting of coarse and heavy portions of said precipitates of impurities, adding to said solution containing a fine precipitate at least one sodium salt selected from the group consisting of sodium hydroxide, sodium carbonate and sodium bicarbonate to form a solution containing sodium ammonium hydrgen phosphate, crystallizing said sodium ammonium hydrogen phosphate in said solution to form crystals having a particle size of not less than 0.3 mm., separating said crystals from the mother liquor containing fine precipitates by using a separating means, through which the mother liquor and precipitates suspended therein are passable but through which the crystals are not passable, thereby retaining the crystals on said means, then washing said crystals with water, and recycling a portion of said mother liquor to the first step as a sodium salt.

10. A method according to claim 9, wherein, prior to the first step, said wet process phosphoric acid is neutralized at a pH-value of less than 2.0 with ammonia, and the amount of said sodium salt used to neutralize the phosphoric acid is in the range of from 0.2 to 3.0 parts by weight per 100 parts by weight of phosphoric acid.

11. A method according to claim 9, wherein the mother liquor is recycled to the first step together with a portion of the solution obtained by washing the crystals with water.

12. A method according to claim 9, wherein the rough separating is effected by decantation, centrifugal sedimentation or filtration, wherein a filter medium having large openings is used.

13. A method according to claim 9, wherein the crystallization of sodium ammonium hydrogen phosphate is effected in a continuous crystallizer.

14. A method according to claim 13, wherein said crystallizer is a continuous cooling crystallizer.

15. A method according to claim 13, wherein said crystallizer is a continuous evaporating crystallizer.

16. A method according to claim 9, wherein said separating means is a filter equipped with a filter medium having openings of 0.3 mm.-0.05 mm.

17. A method according to claim 16, wherein said filter is a vacuum filter.

18. A method according to claim 9, wherein said separating means is a centrifuge.

References Cited
UNITED STATES PATENTS

| | | | |
|---|---|---|---|
| 2,891,856 | 6/1959 | Getsinger et al. | 71—41 |
| 3,201,195 | 8/1965 | Huber et al. | 23—107 |

OSCAR R. VERTIZ, Primary Examiner

G. A. HELLER, Assistant Examiner

U.S. Cl. X.R.

23—106, 300, 302